United States Patent [19]

Burba, III et al.

[11] Patent Number: 5,721,198

[45] Date of Patent: *Feb. 24, 1998

[54] ELASTIC SOLIDS HAVING REVERSIBLE STRESS-INDUCED FLUIDITY

[75] Inventors: John L. Burba, III; Christopher P. Christenson, both of Lake Jackson, Tex.

[73] Assignee: The Dow Chemical Company, Midland, Mich.

[*] Notice: The term of this patent shall not extend beyond the expiration date of Pat. Nos. 4,990,268, and 5,443,761.

[21] Appl. No.: 517,028

[22] Filed: Aug. 18, 1995

Related U.S. Application Data

[63] Continuation of Ser. No. 775,662, Oct. 11, 1991, Pat. No. 5,443,761, and a continuation-in-part of Ser. No. 577,825, Sep. 4, 1990, Pat. No. 5,154,932, and Ser. No. 609,966, Nov. 6, 1990, abandoned, said Ser. No. 775,662, is a continuation-in-part of Ser. No. 698,428, May 10, 1991, Pat. No. 5,196,143, Ser. No. 686,098, Apr. 16, 1991, Pat. No. 5,232,627, and Ser. No. 526,970, May 16, 1990, Pat. No. 5,094,778, which is a continuation of Ser. No. 282,445, Dec. 9, 1988, abandoned, which is a continuation of Ser. No. 47,800, May 7, 1987, Pat. No. 4,790,954, which is a continuation of Ser. No. 752,326, Jul. 5, 1985, Pat. No. 4,664,843, said Ser. No. 577,825, is a continuation of Ser. No. 252,281, Sep. 30, 1988, and a continuation-in-part of Ser. No. 698,428, Ser. No. 686,098, and Ser. No. 526,970, said Ser. No. 252,281, is a continuation-in-part of Ser. No. 60,133, Jun. 9, 1987, Pat. No. 4,990,268, which is a continuation of Ser. No. 752,325, Jul. 5, 1985, abandoned.

[51] Int. Cl.$^6$ ............................. C09K 7/02; B01J 13/00
[52] U.S. Cl. ................ 507/140; 252/314; 252/315.5; 507/269; 507/904; 507/925; 507/926; 524/436
[58] Field of Search .................................. 252/184, 309, 252/314, 315.5, 71; 423/328.1, 328.2, 328.3; 501/118, 119; 428/697; 507/140, 269, 904, 925, 926

[56] References Cited

U.S. PATENT DOCUMENTS

| | | | |
|---|---|---|---|
| 2,795,545 | 6/1957 | Gluesenkamp | 252/28 |
| 2,863,831 | 12/1958 | Thompson | 507/140 |
| 3,252,757 | 5/1966 | Granquist | 252/8.512 X |
| 3,391,088 | 7/1968 | Plank et al. | 423/328 C X |
| 3,855,147 | 12/1974 | Granquist | 252/315.5 |
| 4,019,982 | 4/1977 | Ikari et al. | 210/30 R |
| 4,250,077 | 2/1981 | Von Bonin et al. | 525/404 X |
| 4,310,449 | 1/1982 | Reischl | 524/389 X |
| 4,318,732 | 3/1982 | Sawyer, Jr. | 252/315.5 X |
| 4,392,979 | 7/1983 | Lee et al. | 252/184 |
| 4,446,201 | 5/1984 | Lee et al. | 428/696 |
| 4,451,591 | 5/1984 | Kozak et al. | 523/457 X |
| 4,454,244 | 6/1984 | Woltermann | 502/208 |
| 4,477,367 | 10/1984 | Burba, III | 252/184 |
| 4,629,753 | 12/1986 | Quinn | 524/436 X |
| 4,664,843 | 5/1987 | Burba, III et al. | 252/315.5 |
| 4,790,954 | 12/1988 | Burba, III et al. | 252/315.5 |
| 4,889,885 | 12/1989 | Usuki et al. | 524/445 |
| 4,910,246 | 3/1990 | Burba, III et al. | 524/399 |
| 4,990,268 | 2/1991 | Burba, III et al. | 252/8.514 |
| 5,032,308 | 7/1991 | Knobel et al. | 252/74 |
| 5,094,778 | 3/1992 | Burba, III et al. | 252/315.2 |
| 5,196,143 | 3/1993 | Burba, III et al. | 252/315.5 |
| 5,418,271 | 5/1995 | Burba, III et al. | 524/436 |
| 5,443,761 | 8/1995 | Burba, III et al. | 252/315.5 |

FOREIGN PATENT DOCUMENTS

| | | |
|---|---|---|
| 0142773 | 5/1985 | European Pat. Off. . |
| 0398551 | 11/1990 | European Pat. Off. . |
| 2396061 | 3/1979 | France ................ 252/70 |
| 4249372 | 12/1972 | Japan . |
| 48-29479 | 9/1973 | Japan . |
| 49-18789 | 2/1974 | Japan . |
| 55-127487 | 10/1980 | Japan . |
| WO 92/06135 | 4/1992 | WIPO . |

OTHER PUBLICATIONS

N.P. Tomilov et al., "Synthesis of MGAl$_2$O$_4$ from Coprecipitated Hydroxides", *Neorg. Materialy* 26(12), pp. 2556–2561 (1990).

V.S. Komarov et al., "Variation of the Structure of Aluminum–Copper–Magnesium Absorbents as a Function of the Method of Their Production", Institute for General and Inorganic Chem., Belorussian Academy of Sciences, Minsk (1979).

Dzis'ko et al., "Chemical and Phase Composition and Surface Area of An Aluminomagnesium System", Izvestiya Akademii Nauk SSR, Seriya Khimicheskaya, No. 5, pp. 983–993 (1978).

Turner et al., "Formation of Double Hydroxides and the Titration of Clay", vol. 136, pp. 1052–1054, (Jun. 22, 1962).

Gastuche et al., "Mixed Magnesium–Aluminum Hydroxides", *Clay Minerals*, vol. 7, p. 177 (1967).

(List continued on next page.)

*Primary Examiner*—Richard D. Lovering

[57] ABSTRACT

Elastic solids having reversible stress-induced fluidity are prepared, e.g., by combining liquid formulations with a crystalline mixed metal hydroxide conforming substantially to the formula $$Li_mD_dT(OH)_{(m+2d+3+n \cdot a)}(A^n)_a \cdot xH_2O$$

where m is amount of Li, d is amount of divalent metal D, T is a trivalent metal, A represents at least one anion or negative-valence radical of valence n and a is the amount of A, and xH$_2$O represents excess waters of hydration, if any. These make useful coatings.

The instantly reversible fluidization of these unique elastic solids may be expressed as:

$\sigma = k_\alpha \epsilon$ when $\epsilon < F$, for the solid phase; and $\sigma = f(d\epsilon'/dt)$ when $\epsilon' > F$, (this equation represents a generalized form for the usual theological equations); for a cycle of $\epsilon$, $-xF < \epsilon < xF$, and when $\epsilon'$ equals 0 the liquid phase changes back to the solid phase, and where the symbol $\sigma$ represents stress; $k_\alpha$ represents an elastic spring constant for the solid phase, $\epsilon$ and $\epsilon'$ are strain and F is critical strain.

12 Claims, No Drawings

OTHER PUBLICATIONS

Hunsaker et al., "The Formation of Mixed Magnesium–Aluminum Hydroxides in Soil Materials", *Soil Science Society AmericanProcedure*, vol. 34 (1970).

Clark et al., "Extraction of Exchangeable Cation in Distribution Constants for Ion Exchange", *Soil Science Society Proceeding*, pp. 271–274 (1965).

Brindley et al., "Formation of Mixed Magnesium–Aluminum Hydroxides with Intralayer Nitrate and Carbonate Ions",*Thermochimica Acta*, vol. 27, pp. 385–386 (1978).

Brydon et al., "Stability of Chlorite and Dilute Acid Solutions", *Soil Science Society American Procedure*, vol. 30, pp. 740–744 (1966).

Selim et al., "Structure and Phase Changes in Thermally Treated Mixed Hydroxides of Mg and Al–Effect of Compaction", *Thermochimica Acta*, vol. 19, pp.201–211 (1977).

Feitknecht et al., "On Double Hydroxide and Basic Double Salts III":, *Helv. chim. Acta*, vol. 25, p. 131 (1942).

Mortland et al., "Crystallization of Mixed Hydroxides of Magnesium and Aluminum in a Dialyzed Medium", *Comptes Rendus hebd. Seane Acad. Sci.*, Paris 225, No. 17, pp. 2131–2133, (1962).

Feitknecht et al., "On Magnesium–Aluminum Double Hydroxide and Hydroxy Double Chloride", *Helv. chim. Acta*, vol. 27, p. 1495 (1944).

R. C. Turner et al., Factors Affecting the Solubility of $Al(OH)_3$ Precipitated in the Presence of Montmorillonite, *Soil Science*, vol. 100, No. 3, (1965).

J. S. Clark et al., Reaction of Mixed Magnesium–Aluminum and Calcium–Aluminum Hydroxides with Wyoming Bentonite, Canadian Journal of Earth Sci., vol. 6, No. 47 (1969).

O. P. Krivoruchko et al., Effect of the Preparative Conditions on the Interaction of the Components in Coprecipitated Al(III)–Mg(II) Hydroxides, Canadian Journal of Earth Sci., vol. 6, (1969).

ELASTIC SOLIDS HAVING REVERSIBLE STRESS-INDUCED FLUIDITY

CROSS-REFERENCE TO RELATED APPLICATIONS

This is a continuation of Ser. No. 07/775,662, filed Oct. 11, 1991, now U.S. Pat. No. 5,443,761 which is a continuation-in-part application of application Ser. No. 07/698,428, filed May 10, 1991, now U.S. Pat. No. 5,196,143, and of Ser. No. 07/686,098 filed Apr. 16, 1991 U.S. Pat. No. 5,232,627 and of continuation-in-part of application of Ser. No. 07/526,970 filed May 16, 1990, now U.S. Pat. No. 5,094,778, which is a continuing application under 37 CFR 1.62 of Ser. No. 07/282,445 filed Dec. 9, 1988 (now abandoned) which is a continuing application of Ser. No. 07/047,800 filed May 7, 1987, now U.S. Pat. No. 4,790,954, which is a continuing application of Ser. No. 06/752,326 filed Jul. 5, 1985, now U.S. Pat. No. 4,664,843. All of these are incorporated by reference herein in their entirety.

This is also a continuation-in-part of application Ser. No. 577,825 filed Sept. 4, 1990, now U.S. Pat. No. 5,154,932, which is a continuation of Ser. No. 252,281 filed Sept. 30, 1988, which itself is a continuation-in-part of Ser. No. 060,133 filed Jun. 9, 1987 (now U.S. Pat. No. 4,990,268), which is a continuation of Ser. No. 752,325 filed Jul. 5, 1985 (now abandoned). The above parent application Ser. No. 577,825 filed Sep. 4, 1990 is also a continuation-in-part of application Ser. No. 07/698,428, filed May 10, 1991, now U.S. Pat. No. 5,196,143, and of Ser. No. 07/686,098 filed Apr. 16, 1991 and of continuation-in-part of pending application Ser. No. 07/526,970 filed May 16, 1990, which is a continuing application under 37 CFR 1.62 of Ser. No. 07/282,445 filed Dec. 9, 1988 (now abandoned) which is a continuing application of Ser. No. 07/047,800 filed May 7, 1987, now U.S. Pat. No. 4,790,954, which is a continuing application of Ser. No. 06/752,326 filed Jul. 5, 1985, now U.S. Pat. No. 4,664,843. All of these are incorporated by reference herein in their entirety.

This is also a continuation-in-part of abandoned application Ser. No. 07/609,966 filed Nov.6, 1990 which itself is related to above said Ser. No. 060,133 filed Jun. 9, 1987 (now U.S. Pat. No. 4,990,268), which is a continuation of Ser. No. 752,325 filed Jul. 5, 1985 (now abandoned).

Other patents containing related subject matter are U.S. Pat. No. 4,822,421; U.S. Pat. No. 4,999,025; and U.S. Pat. No. 5,015,409, this latter patent being a continuation-in-part of above said Ser. No. 060,133 filed Jun. 9, 1987 (now U. S. Pat. No. 4,990,268), which is a continuation of Ser. No. 752,325 filed Jul. 5, 1985 now abandoned.

FIELD OF THE INVENTION:

Elastic solids which undergo a reversible phase change to a fluid state under stress, but which immediately revert to their elastic solid state phase when at rest.

BACKGROUND OF THE INVENTION

It has been disclosed in the above-identified applications and patents that certain crystalline layered mixed metal hydroxides and activated mixed metal hydroxides can be used in the modification of the viscosity of various fluid formulations. In some of the disclosures, the said mixed metal hydroxides are combined with clay, e.g. bentonite and others, and with fine-particle silica, to form adducts which are useful for viscosity modification of drilling fluids and other fluids. In some cases, the viscosity is said to be thixotropic, and in other cases the viscosity is merely said to be thickened or modified. Also, some of the above-identified pending applications disclose that fluids gelled by use of the crystalline layered mixed metal hydroxides will quickly re-gel after being subjected to shear.

In a paper prepared for presentation at the 1990 Drilling Conference of the International Association of Drilling Contractors/Society of Petroleum Engineers in Houston, Tex., Feb. 27–Mar. 2, 1990, the efficacy of using MMH (Mixed Metal Hydroxides) in a drilling mud are disclosed. The paper, in its References section on page 5, refers to other papers about the use of MMH in drilling muds at meetings of the IAPC/SPE and SPE Symposium on Oilfield Chemistry in February–March 1989. These publications are cumulative to the information disclosed in U.S. Pat. Nos. 4,664,843 and 4,790,954, the publication of which predates these papers.

None of the patents identified above disclose any recognition of an entirely novel type of viscosity effect which is not of the forms previously known, i.e. those known to rheologists as dilatant, thixotropic, Newtonian, non-Newtonian, psuedo-plastic, Bingham plastic, or rheopexic.

We have now discovered more about some of these reported compounds and formulations containing them and have discovered some which undergo a phase change from an elastic solid state to a fluid state under the force of stress, rather than shear, and which immediately revert to an elastic solid state upon cessation of the stress; this is an unexpected phenomenon- which we believe has not been previously recognized or reported by others, and is believed to be unique. In a manner of speaking, it is a phase metamorphosis, not a chemical metamorphosis.

The phase change of going from an elastic solid phase to a fluid phase by the applying a fluidizing amount of stress, and then reversion back to the elastic solid phase upon cessation of the stress, is not perceived as a viscosity modification in the ordinary sense of the term "viscosity modification".

For example, changing of a Newtonian liquid to a non-Newtonian liquid, or vice-versa, is one form of a viscosity modification. Changing the degree or extent of thixotropicity or dilatancy of a liquid is a form of viscosity modification. These viscosity modifications are not perceived as being a phase change from an elastic solid phase to a fluid phase.

Instead, our new discovery is perceived as a reversible phase change of an elastic solid composition having high energy, short range ionic interactions with a very low degree of reinforcement. Because of this a stress-induced fluidization of the elastic solid is reversible, since the high energy, short range interactions are not destroyed, and the low degree of reinforcement permits the fluidization until reversion back to an elastic solid.

These elastic solids having reversible stress-induced fluidity are perceived as being analagous, in their response to a critical stress, to a solid-state diode in response to a flow of electrons and the cessation of the flow of electrons.

This novel phase change effect is herein given the name of "stress-dependent fluidity" as a means of identifying the effect on an elastic solid which instantly becomes a relatively low-viscosity fluid under a critical stress. The change from an elastic solid phase to a fluid phase begins as soon as the critical stress is applied and the reversion to an elastic solid phase is immediate upon ceasing the stress; by "immediate" it is meant that the reversion to the elastic solid state is a fraction of a second, essentially too fast for visual perception or for measurement using state of the art measuring devices. It is not the same effect as is obtained using shearing forces to break up a gel or a sol since those do not immediately return to the form of a gel or sol, (such as hydrogel, alcogel, organogel, or electrosol) though many will return, at least to some degree, to a gel or sol over a detectable period of time. Some of the various previously known forms of gels or sols may even undergo changes under shearing forces which interfere with, or even prevent a complete return to their previous form upon cessation of the shearing forces.

SUMMARY OF THE INVENTION

It has now been found that novel elastic solids having stress-induced fluidity are prepared by creating a fluid having distributed therein ionic charge sites and also having distributed therein counter-ionic charge sites, the charge sites being present in the fluid in sufficient quantity to produce an elastic solid having stress-induced fluidity. Preferably, the ionic charge sites are anionic, the counter-ionic charge sites are cationic, and the chemical moieties containing the ionic sites comprise about 0.1 to about 50 percent of the total weight of the elastic solid. When stress is applied to the elastic solid, the elastic solid is strained until it suddenly becomes fluidized. The point at which fluidization occurs is referred to here as the critical stress/strain relationship, which is computed as the critical strain point.

The instantly reversible fluidization of these unique elastic solids may be expressed as:

$\sigma = k_\alpha \epsilon$ when $\epsilon < F$, for the solid phase; and $\sigma = f(d\epsilon'/dt)$ when $\epsilon' > F$, (this equation represents a generalized form for the usual rheological equations); for a cycle of $\epsilon$, $-xF << \epsilon < xF$, and when $\epsilon'$ equals 0 the liquid phase changes back to the solid phase, and where the symbol $\sigma$ represents stress; $k_\alpha$ represents an elastic spring constant for the solid phase, $\epsilon$ and $\epsilon'$ are strain and F is critical strain.

Compositions comprising elastic solids having stress-dependent fluidity are found to be useful in a variety of applications for obtaining useful effects of the unique properties of the compositions. Such compositions which benefit from the properties include a variety of coatings, adhesives, gels, resins, and fluids. The fluids comprise aqueous and organic fluids, such as paints, sealers, fillers, glues, protective coatings, temporary coatings, and the like. The fluids can be latex, dispersions, emulsions, solutions, acrylics, acrylates, resins, epoxies, urethanes, rubbers, polyolefins, polyglycols, polyesters, polycarbonates, condensation polymers, polyethers, and the like. Temporary coatings, such as de-icing formulations for airplane wings awaiting take-off, can be formulated as elastic solids which can be blown off the wings by the total stress placed on the formulation by air currents during flight.

Notable among the compounds which are used in preparing these elastic solids, by being added to the desired fluid, are crystalline layered mixed metal hydroxides, including those prepared in aqueous systems, those prepared in non-aqueous systems, and those prepared in a combination of aqueous/non-aqueous systems. Also, adducts of the mixed metal hydroxides are found to be useful in preparing the elastic solids having stress-dependent fluidity by being added to the desired fluid. Preferably the mixed metal hydroxides include aluminum as one of the metals, along with a divalent metal, especially magnesium, and, in some cases, including a monovalent metal, especially lithium. Furthermore, the crystalline layered mixed metal hydroxides may, at times, be called mixed metal oxyhydroxides or mixed metal hydrous oxides. The expression refers to a crystalline structure which contains at least two metals, not to a mere mixture of metal compounds. Most preferable are the crystalline mixed metal hydroxides, crystalline mixed metal oxides, and crystalline mixed metal oxy-hydroxides of Mg and Al. One can begin with anhydrous forms, if desired, and high-temperature activated forms of the mixed metal compounds can be used.

We have found that there are many compositions or formulations which become elastic solids exhibiting stress-dependent fluidity when combined with an effective amount of at least one of the crystalline, layered mixed metal compounds disclosed herein. There are so many permutations of combinations of the mixed metal compounds and the fluids to which they are 'added to achieve stress-dependent fluidity, that absolute numerical ranges are difficult to define. The amount of a given mixed metal compound of this present invention needed to produce an elastic solid having stress-dependent fluidity can be easily determined by testing a few concentrations, usually less than about 10% by weight of the mixed metal compound in the total weight of the combined ingredients. A person skilled in these relevant arts of adjusting the properties of a fluid, and being informed of the present invention, will recognize when a formulation has taken on the appearance of an elastic solid which undergoes a phase change to a low viscosity fluid under the influence of stress and which immediately reverts to the elastic solid phase upon cessation of the fluidizing stress.

DETAILED DESCRIPTIONS INCLUDING BEST MODE KNOWN'

As used herein, the term "stress-dependent fluidity" refers to the fluidization of an elastic solid, which is in contact with a substrate, upon application of a force which induces the elastic solid to undergo a phase change to a fluid state, rather than plastic deformation, and flow along, or upon the substrate. It immediately recovers its elastic solid state upon cessation of the stress, though the shape and/or position on the substrate has been been changed. Considering that a new concept of obtaining stress-dependent liquid flow phase in an elastic solid is encountered here as a reversible phase change, then appropriate means of describing this unique phenomenon are attempted here.

The term "plug flow" is used in the customary manner to indicate that flow is not turbulent flow, but is substantially uniform and monolithic along a flow path, even though there may be some laminar flow due to friction along the interface of the substrate on which there is flow and which tends to hold back ("drag") the fluid.

As used herein, the term "activated" (a term often used in the field of minerals and inorganic chemistry) refers to the heating (thermal activation) of metal hydroxides or hydrous metal oxides, sometimes in the presence of $CO_2$, to a temperature high enough to drive off the waters of hydration, leaving the metals as "active" metal oxides or oxy-hydroxides. Activation of hydrous mixed metal oxides and the like is illustrated in pending application Ser. No. 686,098 filed Apr. 16, 1991 and now U.S. Pat. No. 5,252,627 (attorney docket #C-34297-D) which is incorporated herein by reference as shown hereinbefore. The activated MMOH (hereinafter sometimes referred to as an AHMMO) and other AHMMO compounds, which are arid, are very friable (easily decrepitated), and easily disperse in water as very small crystals, generally of colloidal size. While one may encounter a chemical method for creating activated metal oxides or oxy-hydroxides, the thermal method would be expected to be the easiest and least expensive method.

In one aspect the present invention embodies the making of clay adducts with activated MMOH of the monolayer and the multi-layer variety as well as natural and synthetic hydrotalcites (expressed here simply as $MgO \cdot Al_2O_3$ or $MgAl_2O_4$ since those are the principal components) and other forms of activated mixed metal oxides or mixed metal oxy-hydroxides including AHMMO.

For example, hydrotalcite is a naturally occurring mineral (that contains some $CO_2$ in its structure) which, when thermally dehydrated, yields an active magnesium aluminum oxide compound or oxyhydroxide compound. Also for example, magnesium hydroxide and aluminum hydroxide can be combined (especially in the presence of some $CO_2$) and heated to yield mixed metal oxides conforming essentially to the formula $(MgO)x \cdot Al_2O_3$, where the ratio of Mg/Al can vary over the range of about 0.01/1 to about 6/1, preferably about 0.5/1 to 4/1. Below that range the amount of MgO may not be sufficient to yield a mixed metal oxide which behaves efficiently in the present invention. Above about 4/1, the amount of excess MgO is likely to form a single metal oxide which is present with the mixed metal oxide structure, but as a separate phase.

U.S. Pat. No. 4,748,139 discloses the thermal activation of mixed metal hydroxides at about 500° C. These activated mixed metal oxides were then made into dense spinel structures at above 1000° C. Examples are shown starting with $Mg(OH)_2$ mixed with $NaAlO_2$ and digested at 10506 to form a layered magnesium hydroxide/aluminum hydroxide which forms $MgAl_2O_4$ when heated above 500° C. While this patent teaches the making of some activated mixed metal oxides, it does not each the formation of an adduct of clay with the activated mixed metal oxides. Neither does it disclose the making of an elastic solid which can undergo a reversible phase change and be caused to flow by the force of stress and recover its elastic solid state upon cessation of stress.

Other than the AHMMO compounds, the MMOH compounds may be prepared in accordance with the procedures in parent applications and progeny of this application listed on pages 1 and 2, especially U.S. Pat. No. 4,990,268 (docket #C-33596-A) where they are prepared in aqueous media and Ser. No. 609,966 filed Jan. 16, 1990 and now U.S. Pat. No. 5,084,209 (docket #C-37049) where are made in a non-aqueous media so as to be subsequently free of excess waters of hydration.

Natural clays and refined natural clays may vary from one mining location to another and the performance obtained with one batch may not exactly match the performance of another batch; the color may not match and the effect on viscosity may not match. The natural clays, and even refined natural clays, may contain impurities which can produce non-uniformity among batches and may create side-reactions with other ingredients in a formulation to which the clay is added. Clays are normally anionic and can react with ingredients which are cationic, such as cationic surfactants used in hair conditioners or in cleansers and the like.

We have found that activated mono-layered and multi-layered mixed metal hydroxides (MMOH) and other activated hydrous mixed metal oxides, all of which are referred to here as "AHMMO", especially those which are of layered crystalline structures exhibiting cationic surface charges, are beneficially employed as adducts with clay and with other compounds or materials which are anionic.

For purposes of conciseness, the expression "MMOH" will be used in this disclosure to refer to the crystalline mixed metal hydroxides which are described in detail below and the expression "AHMMO" will be used in reference to activated forms of the MMOH and activated forms of other hydrous metal oxides. The AHMMO compounds which are made from synthetically, produced mixed metal compounds can be of substantially consistent quality and purity. AHMMO compounds made from naturally-occurring minerals, especially hydrotalcites, which can contain small or trace amounts of metal impurities besides the Mg and Al components, are particularly useful in the present invention.

The crystalline mixed metal hydroxides (MMOH) used in the present invention, to create activated mixed metal oxides or oxy-hydroxides, AHMMO, conform substantially to the empirical formula

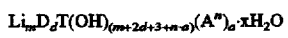
$$Li_m D_d T(OH)_{(m+2d+3+n \cdot a)}(A^n)_a \cdot xH_2O$$

where m is an amount of Li of from zero to one,
where D represents at least one divalent metal cation and d is an amount of from about zero to about 4,
where T represents at least one trivalent metal cation,
where A represents at least one monovalent or polyvalent anion or negative-valence radical,
a is an amount of A ions of valence n, with n·a being an amount of from about zero to about −3,
where (m+2d+3+n·a) is equal to or more than 3,
where (m+d) is not zero,
and where $xH_2O$ represents excess waters of hydration, with x being zero or more.

In the above generic empirical formula, "excess waters of hydration" means that there is more water associated with the compound than is needed to supply the amount of hydroxyl ions in the crystal structure. When there is no excess water and x is essentially zero, the compounds, AHMMO, are very fine "activated" crystals having a cationic charge which are found to have a high affinity for forming adducts with anionic compositions such as clay when dispersed in an aqueous liquid.

In the above formula, it should be noted that n, being the valence of the anion, is a negative number; thus n·a is a negative number.

The AHMMO compounds are found to be beneficial as thickeners or viscosity-modifiers for aqueous-based functional products, such as cleansers, commercial products, household products, and personal care products when incorporated therein, as well as forming useful adducts with clay.

In one aspect, the present invention is perceived as being a formulation of the type described having incorporated therein the MMOH or AHMMO compounds.

In another aspect, the present invention is perceived as a means, method, or process for providing viscosity-modifiers or thickeners to the described formulations by incorporating therein the MMOH or AHMMO compounds, especially as adducts with clay.

A further aspect is that AHMMO compounds provide a thickened, elastic solid product which flows readily under even slight stress, but which rethickens rapidly to an elastic solid state when the stress is ceased. The re-thickening or gelling rate is perceived as being immediate. Liquid dispersions of clay adducts prepared in accordance with the present invention exhibit the novel and unique behavior of exhibiting fluidity which is stress dependent. That is, the liquid dispersion is essentially of a gelled consistency in the absence of any stress placed on it, but becomes quite fluid upon application of a stress. It exhibits neither Newtonian activity, nor thixotropic activity, nor dilatant activity, but instead it responds to a stress placed upon it by instantly becoming very fluid, then when the stress is removed it returns to its previous gelled consistency, which we refer to as an elastic solid.

Though there are many forms of clays, the clays preferred for use in the present adducts comprise the smectite clays, especially the bentonite-type, and montmorillonite clays. Even though this disclosure is based largely on the bentonite forms of clay, other forms and classes of clay are within the ambit of this invention, such as amorphous clay (e.g. of the allophane group) and crystalline clay (e.g. 2-layer, 3-layer expanding-type, non-expanding type, elongate-type, regular mixed layer type, and chain structure type). For example, a non-exhaustive listing of the clays is as follows:

| bentonite | vermiculite | kaolinite |
|---|---|---|
| chlorite | halloysite | attapulgite |
| smectite | sepiolite | montmorillonite |
| polygorskite | illite | Fuller's earth |
| saconite | and the like | |

The activated MMOH and AHMMO compounds useful in the present invention are preferably those of the monodispersed, monolayer variety such as described in parent parents U.S. Pat. Nos. 4,664,843 and 4,990,268 identified above. Compounds which are not of the monolayer varieties, but are of the multi-layer varieties, are shown, e.g., in U.S. Pat. Nos 4,326,961; 4,333,846; 4,347,327; 4,348,295; 4,392,979; 4,446,201; 4,461,714; and 4,477,367. These multi-layered varieties in the activated form can be used in the present invention.

The process, in general, for making the multilayered varieties of mixed metal hydroxides involves starting with a soluble compound of a trivalent metal and then reacting that with the desired soluble monovalent metal(s) and/or divalent metal(s) and converting the said compounds with a source of OH—ions, e.g., $NH_4OH$, at a temperature sufficient to create the multi-layered (generally 2-layer or 3-layer) crystalline mixed metal hydroxide. In contradistinction thereto, the crystalline monolayer mixed metal hydroxides are prepared by combining the desired metal compounds in solution in the desired ratio and then reacting the combination of metal compounds with a source of OH—ions at an appropriate temperature for producing the mixed metal hydroxide crystals.

Thus, for the most part, the MMOH compounds are prepared by the general process of forming a solution of compounds of the desired metals under appropriate conditions whereby a source of hydroxyl ions, e.g. ammonium hydroxide or caustic, reacts with the soluble metal compounds to produce the layered crystals of mixed metal hydroxides. In some instances, it is often best to avoid having residual ammonia in the product, in which case another hydroxy material, especially NaOH or KOH is used.

The process of using activated MMOH and AHMMO compounds to thicken aqueous-based functional products can be achieved in at least two general ways. One method, in general, involves the activation of the MMOH and AHMMO particles by an electrolyte. In this process, the MMOH and AHMMO is first dispersed by using high shear, sonic waves or other methods known in the art to produce a high degree of dispersion of agglomerated particles. Once the material is dispersed in aqueous or partially aqueous media, a salt (electrolyte) is added either predissolved or dry and mixing/or shearing is continued until a smooth, thickened system is obtained Other ingredients may be blended into the prethickened material. Often, one or more of the ingredients is a salt and a separate activator is not needed.

The salt used for activation can be almost any ionic substance but components containing organic anions or multivalent anions such as 603-2, P04-3, P3010-5 and the like are usually more effective.

The other general method involves interaction with other colloidal particles in such a manner that they are linked together through bridges or bonds formed by the MMOH and AHMMO. In these cases, it can be interpreted as forming an adduct with the other particles. This can produce an "extension" effect. This can happen, for instance, when fumed silica or a clay is also an ingredient and less material is needed for thickening. This can also occur when a normally soluble material is included in the formulation beyond the point of saturation such that very small or colloidal particles are present as crystals or agglomerates. In this case, the thickening occurs when the MMOH or AHMMO and other particles are sheared together and agglomerates are broken, exposing fresh faces which react. Adducts of MMOH and fumed silica, a very fine particle form of silica, are disclosed in pending Ser. No. 577,405 filed Sep. 4, 1990 and now abandoned (docket C-36361) which is incorporated herein by reference.

The expression "mixed metal hydroxide" implies that there are at least two different metals in the hydrous oxide crystals. In the present invention, it is preferred that at least one of the metals is a trivalent metal, along with at least one other metal which can be either, or both, of the divalent or monovalent (Li) varieties, preferably the divalent variety. The amount of the A anion (or negative-valence radical) is that which, with the OH—ions, substantially satisfies the valence requirements of the cations in the crystalline material.

In the above described formula, the trivalent metal cation is preferably Al, Fe, or Ga, and can be mixtures of any of these; Al is most preferred as the trivalent metal.

The divalent metal cation is preferably Mg, Ca, Mn, Fe, Co, Ni, Cu, or Zn and can be mixtures of any of these; Ca or Mg, especially Mg, is most preferred as the divalent metal.

The contents of the numerous formulations that can be thickened or modified by the addition of AHMMO compounds can be varied widely. Generally, the ingredients and levels of the ingredients which are in a given formulation have more to do with a desired effect other than that of thickening or viscosity-modification. The versatility of the AHMMO compounds is beneficial in that it can be added to so many formulations for viscosity purposes without interfering with the other ingredients in their intended purpose. Substitutions, replacements, and/or eliminations of one or more of the components (other than the AHMMO compound) often has little effect on thickening or viscosity-modification.

In the following examples the expression "MMOH" is in reference to certain compounds within the generic formula shown above and which conform substantially to the formula $MgAl(OH)_{5-y}Cl_y \cdot xH_2O$ and which are prepared from an aqueous solution containing $MgCl_2$ and $AlCl_3$ as taught, e.g., in U.S. Pat. No. 4,664,843 and U.S. Pat. No. 4,990,268 . The small amount of $Cl^-$ anion is a residual amount of the $Cl^-$ anion which was in the starting materials.

The following examples are for illustration only, but the invention is not limited to the particular illustrations shown.

EXAMPLE 1

One part by weight of methanol containing 2% MMOH by weight is blended with a polyethylene oxide compound. Methanol is then distilled out of the mixture and resultant product is agitated with an ultrasonic probe. The so-formed composition is an elastic solid which undergoes a phase change by becoming fluidized instantly upon the application of a stress and which reverts to its elastic solid phase instantly upon cessation of the stress.

Thus the composition is readily applied onto a substrate as a fluid phase under the application of stress and remains there as an elastic solid coating on the substrate instantly after the applicating force is stopped.

EXAMPLE 2

In accordance with Example 1 above, an epoxy resin DER 331 (Trademark of The Dow Chemical Company) is substituted, in like amount, for the polyethylene oxide compound. The so-formed composition, as in Example 1, is found to undergo an instant phase change from an elastic solid phase to a fluid phase by application of a stress force, and it reverts back to its elastic solid phase instantly upon cessation of the stress force.

The epoxy resin, being one which is curable over a very perceivable, but finite period of time, is easily mixed with the curing agent to complete the formulation as an elastic solid, and then applied to a substrate as a fluidized composition which instantly reverts back to the elastic solid phase upon cessation of the stress force used in applying it to the substrate and then undergoes curing.

What is claimed is:

1. A process comprising incorporating in subterranean operations a water-based elastic solid composition exhibiting stress-dependent fluidity, comprising a fluid containing an amount, sufficient to cause the fluid to be an elastic solid exhibiting stress-dependent fluidity, of a crystalline mixed metal hydroxide conforming essentially to the empirical formula

where m is an amount, in the range of zero to about 1, of Li cations,

D represents divalent metal cations, d is an amount of D and is in the range of zero to about 4, T represents a unit amount of trivalent metal cations, A represents monovalent or polyvalent anions or negative-valent radicals of valence −n, with a being the amount of A anions;

m+d is greater than zero and (m+2d+3+na) is equal to or greater than 3, and x is zero or more if there are excess waters of hydration, said mixed metal hydroxide being essentially uniformly distributed in the fluid system in an amount which produces a gel which has the characteristics of an elastic solid having stress-dependent fluidity.

2. The process of claim 1 wherein the value of m is in the range of about zero to about 1, the value of d is in the range of about 0.5 to about 2, and the amount of A is in the range of zero to about 2.

3. The process of claim 1 wherein the mixed metal hydroxide comprises monolayered, monodispersed crystals.

4. The process of claim 1 wherein the mixed metal hydroxide comprises

where d is an amount in the range of about 0.5 to about 2, n·a is a negative amount in the range of about zero to about 1, and x is an amount of from zero to about 6.

5. The process of claim 1 wherein the layered hydroxide containing fluid is used in subterranean operations as a drilling fluid, drilling mud, fracture fluid, packer fluid or completion fluid.

6. The process of claim 1 wherein the divalent ion is magnesium and the trivalent ion is aluminum.

7. The process of claim 6 including using the layered hydroxide containing fluid in subterranean operations as a drilling fluid, drilling mud, fracture fluid, packer fluid or completion fluid.

8. The process of claim 6 including using the layered hydroxide containing fluid as a drilling fluid.

9. The process of claim 1 wherein the trivalent metal cation is selected from at least one member of the group consisting of Al, Fe and Ga.

10. The process of claim 9 wherein the divalent metal cation is selected from at least one member of the group consisting of Mg, Ca, Mn, Fe, Co, Ni, Cu and Zn.

11. The process of claim 10 including using the layered hydroxide containing fluid in subterranean operations as a drilling fluid, drilling mud, fracture fluid, packer fluid or completion fluid.

12. The process of claim 1 wherein the divalent metal cation is selected from at least one member of the group consisting of Mg, Ca, Mn, Fe, Co, Ni, Cu and Zn.

* * * * *